Patented Apr. 11, 1950

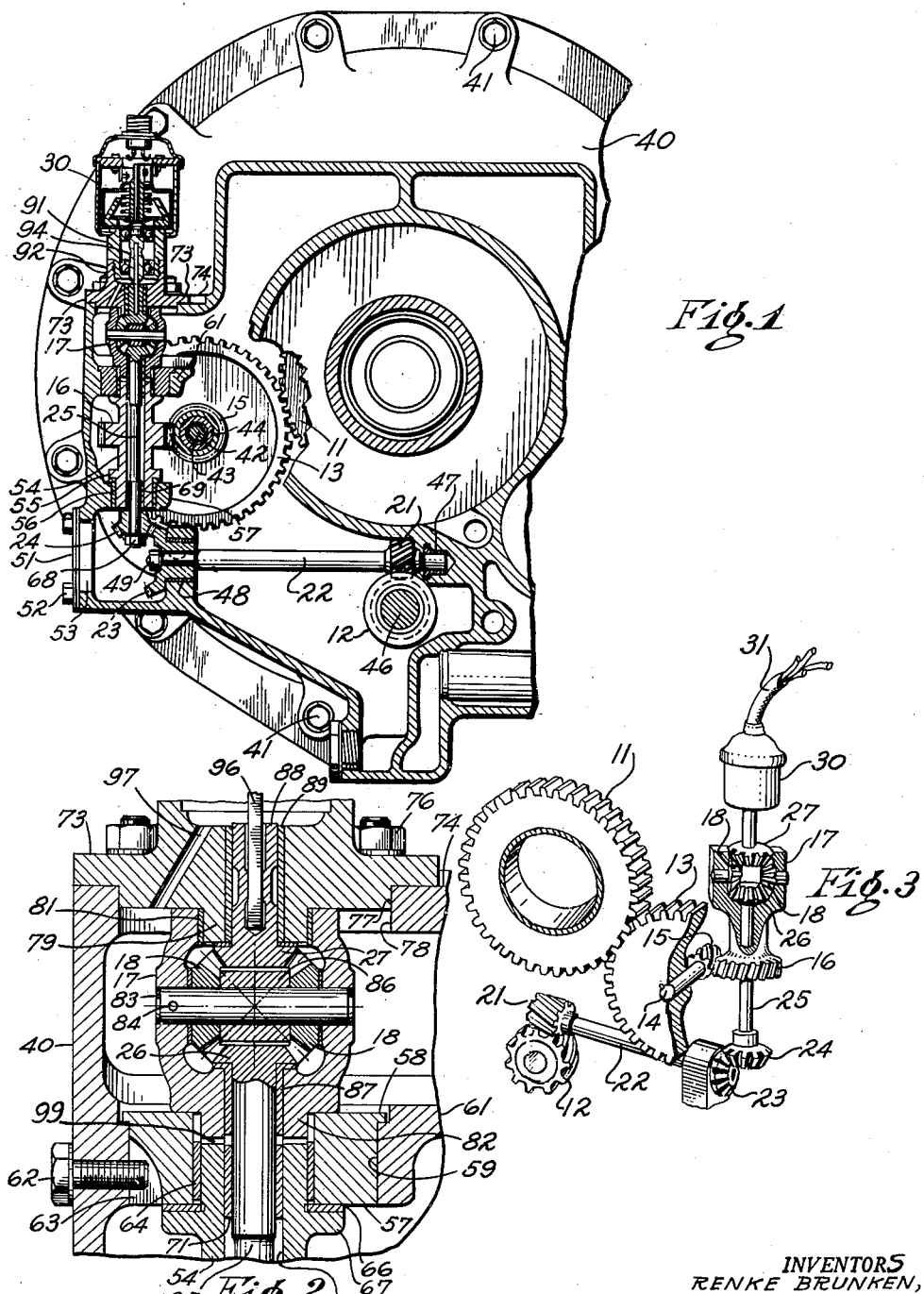

2,503,434

UNITED STATES PATENT OFFICE 2,503,434

CONTROL FOR AUTOMATIC TRANSMISSIONS

Renke Brunken, Shaker Heights, Harry J. Heck, Cleveland Heights, and Wayne R. Howard, Chagrin Falls, Ohio, assignors to The White Motor Company, Cleveland, Ohio, a corporation of Ohio Application January 8, 1947, Serial No. 720,838

13 Claims. (Cl. 74—731)

1

This invention in its preferred application relates to transmissions for motor vehicles and is specifically directed to improved mechanism for the control of transmissions which include both a fluid transmission, such as a torque converter or hydraulic coupling, and a mechanical change speed gear such as the conventional selective sliding gearbox or a planetary transmission.

Automatic transmissions incorporating both hydraulic and mechanical elements are disclosed in U. S. Patent No. 2,373,453 of April 10, 1945 to Renke Brunken for "Automatic gear shifting mechanism for transmission"; Patent No. 2,499,128 dated February 28, 1950 of Renke Brunken for a "Torque converter control"; Patent No. 2,498,600 dated February 21, 1950 of Renke Brunken for "Hydraulic transmission and control mechanism therefor"; and Patent No. 2,484,011, dated October 11, 1949 of Renke Brunken and Raymond Haag for "Electric control mechanism for automatic transmission." All these transmissions include automatic mechanism for shifting gear in a mechanical transmission controlled by the speed relationship of the driving and driven elements of a torque converter through which power is supplied from the engine to the gearbox. These prior disclosures all involve the use of a speed responsive device driven by one element of a differential gear, the other two elements of which are driven from parts of the engine or transmission which rotate at speeds proportional to those of the pump and turbine of the torque converter respectively. The gearing is such that the responsive device is driven at a speed which is a difference-function of the speeds of the pump and turbine.

Previously, the contemplated arrangement of the control device was to install the speed responsive device and differential gear as a unit remote from the engine and transmission and to drive the unit through flexible shafts of the general type used for speedometer drives and the like.

The present invention is directed to an improved construction by virtue of which the differential gear and the driving mechanism therefor may be installed within the transmission housing and the speed responsive device, which usually takes the form of a centrifugal switch, and which will be called a governor hereafter for brevity, is removably mounted on the outside of the transmission housing in such a way as to be driven directly by the output of the differential gearing.

In this way, flexible shafting is eliminated, greater reliability is secured, lubrication problems are eliminated, and a more compact installation

2 is obtained. The invention involves a novel design of the differential gear unit, the drive gearing and the transmission housing to facilitate assembly and disassembly while retaining ruggedness and avoiding interference with the transmission mechanism as such.

The invention is illustrated herein as incorporated in a transmission which is, in all relevant particulars, substantially identical with that described in the abovementioned Patent No. 2,498,600. The description herein will, therefore, be confined to the differential gearing and the driving connections therefor, without repeating the details of the transmission per se or its control instrumentalities.

Referring to the drawings:

Fig. 1 is a transverse vertical section of a transmission incorporating the invention;

Fig. 2 is an enlarged view of a portion of Fig. 1 to show certain features more clearly; and Fig. 3 is a schematic perspective drawing of the gearing.

The general nature of the invention may best be understood by referring to the schematic drawing of Fig. 3, in which 11 is a spur gear mounted on the rear part of the torque converter casing, which is directly coupled with the engine of the vehicle, and within which are fixed the vanes of the driving member or pump of the torque converter. A spiral gear 12 is fixed on the forward end of the countershaft of the gear box. The countershaft is constantly driven by the main shaft of the transmission which is permanently coupled to the driven member or turbine of the torque converter. Gears 11 and 12 are therefore driven at speeds proportional to those of the driving and driven members of the hydraulic transmission, respectively. A spur gear 13 meshing with the gear 11 is mounted on a shaft 14 on which is also mounted a spiral gear 15. The shaft 14 is parallel to the transmission main and countershafts. The spiral gear 15 drives a spiral gear 16 which is coupled to the cage or spider 17 of the differential gear, which has bevel planet wheels 18 rotatably mounted therein. The spiral gear 12 drives a spiral gear 21 fixed on a horizontal shaft 22 directed transversely of the transmission. A bevel gear 23 on the shaft 22 drives a bevel gear 24 on a vertical shaft 25 which extends through the gear 16 and the lower part of the spider 17 and has a bevel sun gear 26 mounted on its upper end meshing with the planet gears 18. The other sun gear 27 of the differential gear is coupled to a centrifugal circuit closing device or governor 30 which is connected by leads 31 to the electrical system which controls shifting of the gears in the gear box.

With the pump and turbine rotating in the same direction, which is the normal mode of operation, the spider 17 and sun gear 26 are rotated in the same direction. Rotation of the spider tends to rotate the sun gear 27 in the same direction, whereas rotation of the sun gear 26 tends to rotate the sun gear 27 in the opposite direction. The rotation of the sun gear 27 and governor 30 is thus a difference-function of the rotations of the pump and turbine. The gear ratios are so calculated that these two inputs cancel out and the sun gear 27 is stationary at a desired control point which is approximately the condition of equal rotation of the pump and turbine. The point of zero rotation of the sun gear 27 is determined with respect to the characteristics of the engine, torque converter, gear box, and vehicle, and the performance desired of the vehicle. The principles of operation of the system are described in the above-mentioned patent and applications.

Referring to Fig. 1, the mechanism so far described is mounted in and on a housing 40 which is shown partially cut away and which bolts to a companion housing (not shown) fixed to the engine to form an enclosure for the torque converter. Fig. 1 is a vertical section through the rear part of the housing looking toward the torque converter. The gear case (not shown) is bolted to the rear part of the housing 40. The gear case, the housing 40, and the companion housing bolted to the engine form a functionally unitary housing for the entire transmission. Gear 11, which is fixed to the rear face of the torque converter casing in any convenient manner, drives the gear 13 which is rotatably mounted on a bushing 42 supported by a stub shaft 43 extending from a vertical face of the housing 40. The spiral gear 15 is pressed on to a rearwardly extending hub 44 of the gear 13, the gears 13 and 15 thus rotating as a unit on the bushing 42. The spiral gear 12 is fixed in any convenient manner on the forward end of the gearset countershaft 46 which projects forward into the torque converter housing. Gear 12 drives the spiral gear 21 fixed on the horizontal shaft 22 which is rotatably mounted in bushings 47 and 48 in the casting 40. The bevel gear 23 is secured to the shaft 22 by a nut 49 and is formed with a hub portion which is journalled in the bushing 48. An access plate 51 secured by cap screws 52 covers an opening 53 through which the gears 23 and 21 and shaft 22 may be withdrawn. It will be understood, of course, that all gears in the mechanism may be keyed or splined to their shafts according to usual practice.

The spiral gear 16 which meshes with the gear 15 is formed integral with an elongate hub 54, the lower end of which is formed with a flange 55 and is journalled in a bushing 56 which provides radial and thrust bearing surfaces for the hub. The bushing 56 is fitted in a bore in a bracket extending inwardly from the vertical side wall portion of the casting 40. The arrangement for supporting the upper end of the hub 54 is shown more clearly in Fig. 2. A bushing 57 formed with a flange 58 is fitted in a recessed bore 59 in a transverse web 61 of the housing 40. The bushing is held against rotation by a cap screw 62 threaded into the housing and entering a slot 63 in the outer wall of the bushing 57. The upper end of the hub 54 is journalled in a bearing sleeve 64 in the bushing 57 and a thrust bearing washer 66 is fitted between the lower face of the bushing 57 and the flange 67 of the hub. The bevel gear 24, Fig. 1, is secured to the lower end of the shaft 25, (Figs. 1 and 2) by a nut 68. The shaft 25 is journalled in bushings 69, (Fig. 1), and 71, (Fig. 2), pressed into the central bore 72 of the hub 54.

A cover plate and governor mounting bracket 73 is mounted on a horizontal upper surface 74 of the housing 40 by studs and nuts 76 and is formed with a portion 77 which enters an aperture 78 in the housing to secure exact alignment of the bracket 73. The under surface of the plate 73 is formed with an annular boss 79 on which is rotatably mounted the differential cage 17, a bearing sleeve 81 being provided. The lower end of the differential cage is formed with an extension 82 disposed within the bore in the bushing 57. The cage is held against longitudinal movement by the bushing 57 and the cover plate 73. The differential cage 17 is of usual form, and mounts a transverse shaft 83 held in place by a pin 84. The planet gears 18 are mounted on the shaft 83 and separated by a spacer block 86. The sun gear 26 is formed integral with the upper end of the shaft 25, the cage 17 is journalled on the shaft by a thrust and radial bearing sleeve 87. The upper end of the hub 54 and the lower end 82 of the differential cage are in close proximity to each other within the bushing 57 and are formed with dog teeth 99 so that the cage 17 is positively driven by the gear 16. The planet gear 27 is formed integral with a shaft 88 journalled in a bushing 89 fitted in a central bore of the bracket 73. The two sun gears mesh with the planet gears in the usual manner. The governor 30, Fig. 1, is provided with a base portion 91 which is threaded into the tapped upwardly extending boss 92 of the cover plate 73 and is thus readily removable. The drive shaft 94 of the governor is formed with a square central hole and the shaft 88 likewise has a square central opening, square key 96 received within the shafts coupling the shafts 88 and 94 together. An oil drain hole 97 is drilled through the plate 73. The governor 30 is a centrifugal switch, the details of which form no part of the present invention. Since such switches are commercially available, the details of the governor 30 will not be described herein.

The assembly shown herein is particularly adapted to ease of repair and replacement of parts. The governor 30 may be unscrewed from the cover plate, the key 96 permitting ready removal of the governor. By taking out the nuts 76, the cover plate 73 may be lifted off. Planet gear 27 may then be removed through the upper opening in the cage 17. By taking off the cover plate 51, the bevel gear 24 and the shaft 22 with its gears may be taken out. Removal of the screw 62 provides clearance for the rest of the mechanism to be pushed through the holes 59 and 78. The opening 78 is large enough to pass the bushing 57, and the hole 59 will pass the gear 16. The gear 24 may be made smaller than the lower journal of the hub 54 so that the assembly may be removed without taking bevel gear 24 off.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In an automatic transmission comprising a hydraulic drive member, an annular casing for the drive member rotatable therewith, a hydraulic driven member within the casing and mounted on a shaft extending therefrom, a gearset including a main shaft, the main shaft constituting an extension of the driven member shaft, and a fixed housing for the hydraulic members and gearset: a speed-responsive device, means for mounting the speed-responsive device on the housing, a differential gear within the housing, means for coupling the speed-responsive device to one side of the differential gear for rotation thereby, concentric shafts for driving the spider and other side of the differential, a gear on the casing, a gear driven from the main shaft, and means within the housing for driving the concentric shafts from the two last-named gears respectively.

2. In an automatic transmission comprising a hydraulic drive member, an annular casing for the drive member rotatable therewith, a hydraulic driven member within the casing and mounted on a shaft extending therefrom, a gearset including a main shaft and a countershaft driven thereby, the main shaft constituting an extension of the driven member shaft, and a fixed housing for the hydraulic members and gearset: a speed-responsive device, means for mounting the speed-responsive device externally of the housing, a differential gear within the housing, means for coupling the speed-responsive device to one side of the differential gear for rotation thereby, concentric shafts for driving the spider and other side of the differential, a gear on the casing, a gear on the countershaft, and means within the housing for driving the concentric shafts from the casing gear and countershaft gear respectively.

3. In combination, a fluid transmission including a pump and a turbine, a gearbox including a main shaft driven by the turbine, and means responsive to the speed relation of the pump and turbine for controlling shifting of gears in the gearbox, the last-named means comprising a first gear on the pump, a first shaft directed longitudinally of the gearbox and driven by the first gear, a hollow shaft driven by the first shaft, a second shaft directed transversely of the gearbox and driven from the main shaft, a third shaft mounted within the hollow shaft and driven by the second shaft, a differential gear having three elements, two of the elements being driven by the hollow shaft and third shaft respectively, and a speed-sensitive device driven by the third element.

4. In combination, a fluid transmission including a pump and a turbine, a gearbox including a main shaft and a countershaft, the main shaft being driven by the turbine, and means responsive to the speed relation of the pump and turbine for controlling shifting of gears in the gearbox, the last-named means comprising a first gear on the pump, a first shaft directed longitudinally of the gearbox and driven by the first gear, a hollow shaft driven by the first shaft, a second gear on the countershaft, a second shaft directed transversely of the gearbox and driven by the second gear, a third shaft mounted within the hollow shaft and driven by the second shaft, a differential gear having three elements, two of the elements being driven by the hollow shaft and third shaft respectively, and a speed-sensitive device driven by the third element.

5. In combination, a fluid transmission including a pump and a turbine, a gearbox including a main shaft and a countershaft, the main shaft being driven by the turbine, and means responsive to the speed relation of the pump and turbine for controlling shifting of gears in the gearbox, the last-named means comprising a first gear on the pump, a first shaft directed longitudinally of the gear box and driven by the first gear, a hollow shaft driven by the first shaft, a second gear on the countershaft, a second shaft directed transversely of the gearbox and driven by the second gear, a third shaft mounted within the hollow shaft and driven by the second shaft, a differential gear having three elements, two of the elements being driven by the hollow shaft and third shaft respectively, the two said elements acting upon the third element in opposite senses, and a speed-sensitive device driven by the third element.

6. In combination, a fluid transmission including a pump and a turbine, a gearbox including a main shaft and a countershaft, the main shaft being driven by the turbine, and means responsive to the speed relation of the pump and turbine for controlling shifting of gears in the gearbox, the last-named means comprising a first gear on the pump, a first shaft directed longitudinally of the gearbox and driven by the first gear, a hollow shaft driven by the first shaft, a second gear on the countershaft, a second shaft directed transversely of the gearbox and driven by the second gear, a third shaft mounted within the hollow shaft and driven by the second shaft, a differential gear having three elements, two of the elements being driven by the hollow shaft and third shaft respectively, and a speed-sensitive device mounted on the gearbox externally thereof and driven by the third element.

7. In combination, a fluid transmission including a pump and a turbine, a gearbox including a main shaft driven by the turbine, and means responsive to the speed relation of the pump and turbine for controlling shifting of gears in the gearbox, the last-named means comprising a first gear on the pump, a first shaft directed longitudinally of the gearbox and driven by the first gear, a hollow shaft driven by the first shaft, a second shaft directed transversely of the gearbox and driven from the main shaft, a third shaft mounted within the hollow shaft and driven by the second shaft, a differential gear having a cage driven by the hollow shaft and one side gear driven by the third shaft, and a speed-sensitive device driven by the other side gear of the differential, the hollow shaft and third shaft normally rotating in the same direction.

8. A differential governor adapted for mounting on a transmission housing comprising a cover plate adapted for mounting over an opening in the housing, a speed-responsive device mountable on the cover plate outside the housing, a drive shaft for the responsive device journalled in the cover plate, a differential gear assembly having one element coupled to the drive shaft and being rotatably supported by the cover plate, a sleeve journalling the gear assembly and adapted to be fitted in an aperture in a first bracket in the housing, a hollow shaft having a gear thereon, journalled at one end in the sleeve adjacent the gear assembly, the hollow shaft and one element of the differential gear being clutched together, the gear being of smaller diameter than the sleeve and aperture and the sleeve of smaller diameter than the opening in the housing, the other end of the hollow shaft being adapted for rotation in an aperture in a second bracket in the housing, a central shaft journalled in and extending through the hollow shaft and coupled to the third element of the differential gear, and a drive gear mounted on the central shaft external to the hollow shaft, the drive gear being small enough to pass through the apertures and the opening.

9. A differential governor adapted for mounting on a transmission housing comprising a cover plate adapted for mounting over an opening in the housing, a speed-responsive device mountable on the cover plate outside the housing, a drive shaft for the responsive device journalled in the cover plate and having a first sun pinion thereon, a differential cage circumjacent the pinion and rotatably supported at one end by the cover plate, a sleeve journalling the other end of the cage and adapted to be fitted in an aperture in a first bracket in the housing, a hollow shaft having a gear thereon, journalled at one end in the sleeve adjacent the cage, said hollow shaft and the cage being clutched together, the gear being of smaller diameter than the sleeve and aperture and the sleeve of smaller diameter than the opening in the housing, the other end of the hollow shaft being adapted for rotation in an aperture in a second bracket in the housing, planet gears in the cage meshing with the first sun pinion, a second sun pinion meshing with the planet gears and mounted on a central shaft journalled in and extending through the hollow shaft, and a drive gear mounted on the central shaft external to the hollow shaft, the drive gear being small enough to pass through the apertures and the opening.

10. In combination with a transmission housing, a differential governor adapted for mounting on the housing comprising a cover plate adapted for mounting over an opening in the housing, a speed-responsive device mountable on the cover plate outside the housing, a drive shaft for the responsive device journalled in the cover plate and having a first sun pinion thereon, a differential cage circumjacent the pinion and rotatably supported at one end by the cover plate, a first bracket in the housing, a sleeve journalling the other end of the cage and adapted to be fitted in an aperture in the first bracket, a hollow shaft having a gear thereon, journalled in the sleeve adjacent the cage, said hollow shaft and cage being clutched together, the gear being of smaller diameter than the sleeve and aperture and the sleeve of smaller diameter than the opening in the housing, a second bracket in the housing, the other end of the hollow shaft being adapted for rotation in an aperture in the second bracket, planet gears in the cage meshing with the first sun pinion, a second sun pinion meshing with the planet gears and mounted on a central shaft journalled in and extending through the hollow shaft, and a drive gear mounted on the central shaft external to the hollow shaft, the drive gear being small enough to pass through the apertures and the opening.

11. A differential governor adapted for mounting on a transmission housing comprising a cover plate adapted for mounting over an opening in the housing, a governor mechanism mountable on the cover plate outside the housing, a drive shaft for the governor mechanism journalled in the cover plate, a differential gear assembly having one element coupled to the drive shaft and being rotatably supported by the cover plate, a sleeve journalling the gear assembly and adapted to be fitted in an aperture in a first bracket in the housing, a hollow shaft having a gear thereon, journalled at one end in the sleeve adjacent the cage, the hollow shaft and one element of the differential gear being clutched together, the gear being of smaller diameter than the sleeve and aperture and the sleeve of smaller diameter than the opening in the housing, the other end of the hollow shaft being adapted for rotation in an aperture in a second bracket in the housing, a central shaft journalled in and extending through the hollow shaft and coupled to the third element of the differential gear, and a drive gear mounted on the central shaft external to the hollow shaft, the drive gear being small enough to pass through the apertures and the opening.

12. A differential governor adapted for mounting on a transmission housing comprising a cover plate adapted for mounting over an opening in the housing, a governor mechanism mountable on the cover plate outside the housing, a drive shaft for the governor mechanism journalled in the cover plate and having a first sun pinion thereon, a differential cage circumjacent the pinion and rotatably supported at one end by the cover plate, a sleeve journalling the other end of the cage and adapted to be fitted in an aperture in a first bracket in the housing, a hollow shaft having a gear thereon, journalled in the sleeve adjacent the cage, the hollow shaft and cage being clutched together, the gear being of smaller diameter than the sleeve and aperture and the sleeve of smaller diameter than the opening in the housing, the other end of the hollow shaft being adapted for rotation in an aperture in a second bracket in the housing, planet gears in the cage meshing with the first sun pinion, a second sun pinion meshing with the planet gears and mounted on a central shaft journalled in and extending through the hollow shaft, and a drive gear mounted on the central shaft external to the hollow shaft, the drive gear being small enough to pass through the apertures and the opening.

13. In combination with a transmission housing, a differential governor adapted for mounting on the housing comprising a cover plate adapted for mounting over an opening in the housing, a governor mechanism mountable on the cover plate outside the housing, a drive shaft for the governor mechanism journalled in the cover plate and having a first sun pinion thereon, a differential cage circumjacent the pinion and rotatably supported at one end by the cover plate, a first bracket in the housing, a sleeve journalling the other end of the cage and adapted to be fitted in an aperture in the first bracket, a hollow shaft having a gear thereon, journalled in the sleeve adjacent the cage, said hollow shaft and cage being clutched together, the gear being of smaller diameter than the sleeve and aperture and the sleeve of smaller diameter than the opening in the housing, a second bracket in the housing, the other end of the hollow shaft being adapted for rotation in an aperture in the second bracket, planet gears in the cage meshing with the first sun pinion, a second sun pinion meshing with the planet gears and mounted on a central shaft journalled in and extending through the hollow shaft, and a drive gear mounted on the central shaft external to the hollow shaft, the drive gear being small enough to pass through the apertures and the opening.

RENKE BRUNKEN.
    HARRY J. HECK.
    WAYNE R. HOWARD.

REFERENCES CITED

The following references are of record in the file of this patent:

UNITED STATES PATENTS

| Number | Name | Date |
|---|---|---|
| 1,503,763 | Mosely | Aug. 5, 1924 |
| 2,092,381 | Stewart | Sept. 7, 1937 |
| 2,302,714 | Pollard | Nov. 24, 1942 |
| 2,373,453 | Brunken | Apr. 10, 1945 |

FOREIGN PATENTS

| Number | Country | Date |
|---|---|---|
| 17,981 | Great Britain | Aug. 7, 1907 |